US008244305B2

(12) United States Patent
Ramesh et al.

(10) Patent No.: US 8,244,305 B2
(45) Date of Patent: Aug. 14, 2012

(54) EFFICIENT, SECURE DIGITAL WIRELESS VOICE TELEPHONY VIA SELECTIVE ENCRYPTION

(75) Inventors: Rajaram Ramesh, Raleigh, NC (US); Kumar Balachandran, Cary, NC (US); Havish Koorapaty, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1170 days.

(21) Appl. No.: 11/757,679

(22) Filed: Jun. 4, 2007

(65) Prior Publication Data

US 2008/0298285 A1 Dec. 4, 2008

(51) Int. Cl.
*H04M 1/00* (2006.01)
*H04B 1/38* (2006.01)

(52) U.S. Cl. ....... 455/563; 455/67.7; 455/411; 455/410; 380/37; 380/255; 380/275

(58) Field of Classification Search ................ 455/67.7, 455/563, 570, 410, 411; 704/214, 215, 277; 370/912, 352, 516; 380/37, 43, 255, 274–277, 380/270, 236, 244

See application file for complete search history.

(56) References Cited

U.S. PATENT DOCUMENTS

| | | | | |
|---|---|---|---|---|
| 5,594,869 A * | 1/1997 | Hawe et al. | ................... | 713/152 |
| 5,712,915 A * | 1/1998 | Onufry, Jr. | ..................... | 380/270 |
| 6,266,412 B1 * | 7/2001 | Berenzweig et al. | ........... | 380/37 |
| 6,272,633 B1 * | 8/2001 | Duke et al. | ..................... | 713/171 |
| 6,990,198 B2 * | 1/2006 | Kim | ................................. | 380/37 |
| 7,460,671 B1 * | 12/2008 | Rossello et al. | ............... | 380/275 |
| 2002/0172364 A1 * | 11/2002 | Mauro | ........................... | 380/270 |
| 2003/0018480 A1 * | 1/2003 | Mecayten | ..................... | 704/277 |
| 2004/0193871 A1 * | 9/2004 | Seshadri | ........................ | 713/154 |
| 2004/0240436 A1 * | 12/2004 | Yao et al. | ....................... | 370/352 |
| 2006/0115088 A1 * | 6/2006 | Valentine et al. | .............. | 380/270 |
| 2006/0172722 A1 * | 8/2006 | Christensen et al. | ......... | 455/410 |
| 2006/0198520 A1 * | 9/2006 | Courtney et al. | .............. | 380/247 |
| 2006/0269065 A1 * | 11/2006 | Lindteigen et al. | ........... | 380/270 |

FOREIGN PATENT DOCUMENTS

JP 2000-286887 A 10/2000

OTHER PUBLICATIONS

Servetti et al., "Perception-Based Selective Encryption of G.729 Speech," Proceedings of IEEE International Conference on Acoustics, Speech, and Signal Processing (ICASSP'02), 2002, pp. I-621-I-624.

* cited by examiner

*Primary Examiner* — Erika Gary
*Assistant Examiner* — Mong-Thuy Tran
(74) *Attorney, Agent, or Firm* — Coats & Bennett, P.L.L.C.

(57) ABSTRACT

Secure, digital, packet-switched, voice telephony calls are wirelessly transmitted in an efficient manner that reduces air interface bandwidth consumption by encrypting only vocoder data frames containing encoded speech, and not encrypting vocoder data frames that do not contain speech, such as those containing silence parameters. The collective reduced bandwidth consumption across a large number of voice telephony calls may allow for the admission of one or more new calls during times of voice telephony congestion. Not encrypting the silence parameters does not compromise call privacy or security, since the silence data frames do not carry any speech. The classification of encoded data frames as containing speech or not may be performed in a variety of ways.

11 Claims, 2 Drawing Sheets

EFFICIENT, SECURE DIGITAL WIRELESS VOICE TELEPHONY VIA SELECTIVE ENCRYPTION

FIELD OF THE INVENTION

The present invention relates generally to digital wireless voice telephony systems, and in particular to a method and apparatus for efficient, secure digital wireless voice telephony via selective encryption.

BACKGROUND

Early wireless voice telephony systems utilized circuit-switched technology for both analog and digital data transfer, wherein a logical traffic channel was dedicated to each voice communication session, or call. Modern systems, in contrast, are all digital and employ packet-switched technology. In packet-switched systems, common logical traffic channels carry a plurality of data packets, each packet intended for, and addressed to, a particular mobile terminal. For secure communications, the packets containing digitally encoded speech are encrypted, such as using the Advanced Encryption Standard (AES). The encryption process adds some overhead to the data packets, which in the case of large packets, is negligible.

Human speech is not continuous, but rather includes many pauses, such as between thoughts or sentences, and when a user pauses to listen to the other party. While it would minimize the use of air interface resources to simply not transmit any data during speech pauses, experience indicates that complete silence during a pause in speech is disconcerting to users. Users prefer to hear some sound, such as background noise of the other party's environment, during pauses in speech. Accordingly, when speech is digitally encoded, "silence parameters" are encoded and transmitted in speech data frames that allow background noise to be reconstructed by a receiver. The reconstructed background noise is known in the art as "comfort noise." The data frames carrying silence parameters are small compared to data frames carrying encoded speech.

As mentioned above, the overhead added by encryption to data packets containing encoded speech data frames is small or negligible. However, the encryption overhead is a significant portion of data frames carrying encoded silence parameters. This overhead reduces the available bandwidth, and contributes to network congestion during periods of heavy voice telephony use.

SUMMARY

According to one or more embodiments, air interface bandwidth consumption is reduced for secure voice telephony calls by encrypting only data frames containing encoded speech, and not encrypting data frames that do not contain speech, such as those containing silence parameters. The collective reduced bandwidth consumption across a large number of voice telephony calls may allow for the admission of one or more new calls during times of voice telephony congestion. Not encrypting the silence parameters does not compromise call privacy or security, since the silence data frames do not carry any speech. The classification of encoded data frames as containing speech or not may be performed in a variety of ways.

One embodiment relates to a method of efficiently transmitting secure digital speech. Speech audio is encoded into a plurality of digital data frames. The data frames are classified as containing encoded speech or not. The data frames containing encoded speech are encrypted and the data frames not containing encoded speech are not encrypted. The data frames are then transmitted.

Another embodiment relates to a base station of a wireless communication system receiving digitally encoded speech audio in a plurality of data frames. The base station includes a classification circuit operative to classify the data frames as containing encoded speech or not. The base station also includes an encryption circuit operative to encrypt the data frames containing encoded speech and to not encrypt the data frames not containing encoded speech.

Yet another embodiment relates to a wireless communication system mobile terminal. The mobile terminal includes a user interface and a vocoder receiving speech audio from the user interface and digitally encoding the speech in a plurality of data frames. The mobile terminal also includes a classification circuit operative to classify the data frames as containing encoded speech or not. They mobile terminal further includes an encryption circuit operative to encrypt the data frames containing encoded speech and to not encrypt the data frames not containing encoded speech.

DETAILED DESCRIPTION

Figure 1:
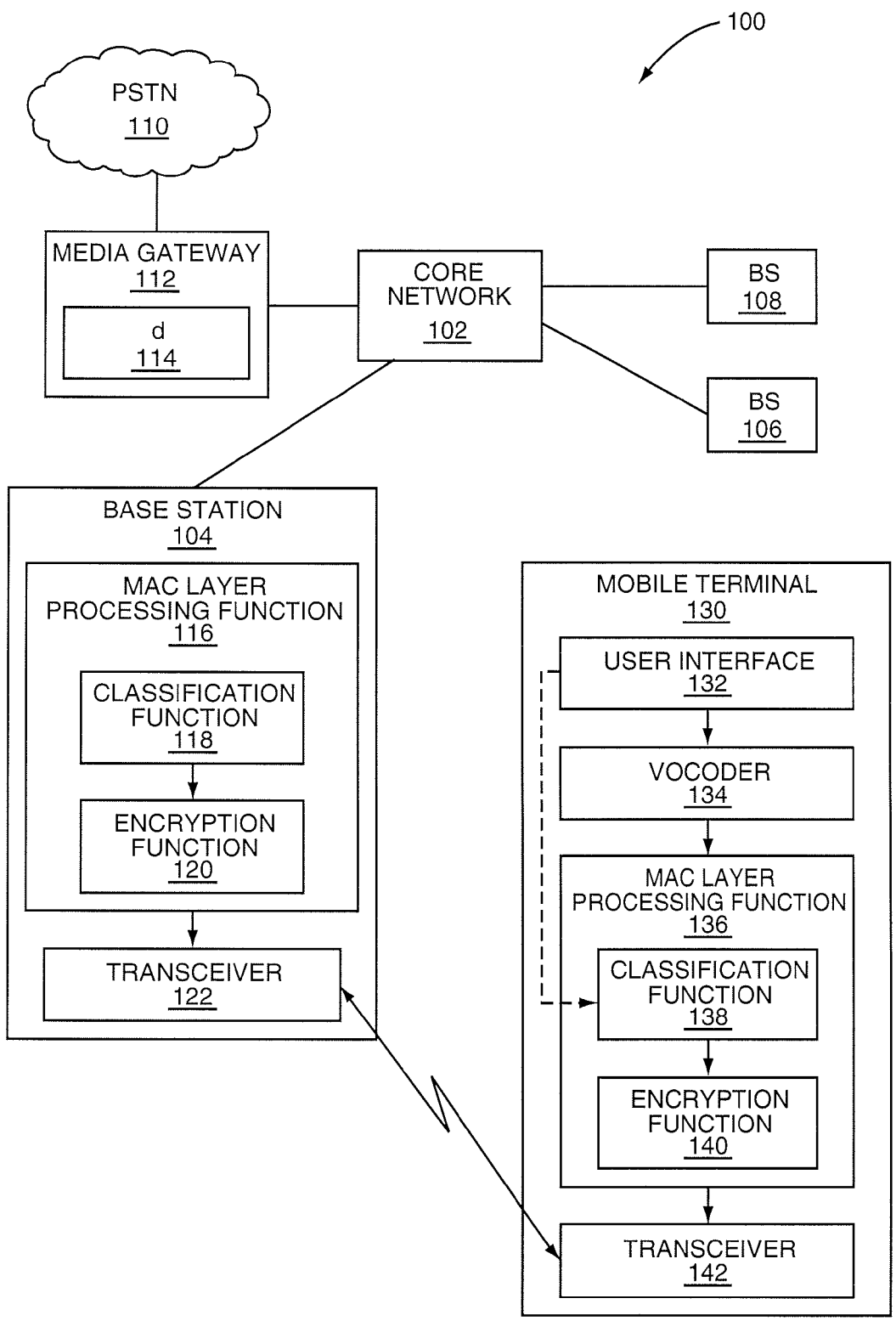
FIG. 1 is a functional block diagram of a wireless communication system.

FIG. 1 depicts a wireless communication network 100. The network 100 may conform to any of a variety of industry standards, such as cdma200Wideband CDMA (WCDMA), or the World Interoperability for Microwave Access (Mobile WiMaX). A Core Network (CN) 102 interconnects a plurality of base stations 104, 106, 108, also known in the art as network Access Points (AP). The Core Network 102 additionally connects to a Media Gateway 112, which in turn connects to one or more external networks 110, such as the Public Switched Telephone Network (PSTN) or the Internet. The Media Gateway 112 is a transcoding point in the network 100, translating content between various formats in the external networks 110 and the digital format employed by the network 100. The Media Gateway 112 includes a vocoder 114 for encoding and synthesizing speech transmitted between the external network 110 and the network 100 in a digital format.

As known in the art, a vocoder (voice encoder/decoder) 114 is a circuit that analyzes speech and generates digital data representing the speech, and inversely receives digital data representing speech and synthesizes the speech. Vocoders 114 are employed at either end of a communication channel that transmits speech in data packets, using schemes such as in a Voice over IP (VoIP) system. Many vocoders in wireless communications systems 100 encode speech at a variable rate. For example, the Enhanced Variable Rate Codec (EVRC) utilized in cdma2000 operates on 20 msec frames, and outputs either 171 bits, 80 bits, 40 bits, or 16 bits. The rate is chosen depending on the level of speech activity in the frame. In particular, silent frames are encoded at the lowest rate, producing the smallest data frames. Another example of a variable rate vocoder is the Adaptive Multi-Rate (AMR) vocoder, which adaptively lowers its speech encoding rate in the presence of poor channel quality, and concomitantly increases the level of error correction coding to provide more robust speech communication within the same bandwidth. During periods of silence, the AMR vocoder generates silence descriptor (SID) frames that are transmitted with a lower periodicity, e.g., 120 ms.

The Core Network 102 forwards encoded speech data frames from the vocoder 114 to the base station 104. After various processing and formatting such as RTP, UDP, IP, or the like, the data frames are passed to a Media Access Control (MAC) layer processing function 116. The MAC layer is a sub-layer in the wireless communication network 100 protocol stack, defined in the relevant standards. The MAC layer processing function 116 encrypts speech data frames, encapsulates them into data packets, assigns a MAC address to each data packet, and passes the data packets to a physical layer protocol, which controls transmission of the data packets by the transceiver 122.

An encryption function 120 encrypts speech data frames. The encryption process, according to the AES standard, transforms plaintext encoded speech data in the data frames into encrypted cipher text. The encryption function 120 additionally prepends a 4-byte packet number to each data frame, and appends an 8-byte cipher text Integrity Check Value (ICV). Encrypting a data frame thus adds twelve bytes (assuming the cipher text representation of the encoded speech data is the same size as the plaintext). In the case of an EVRC-encoded data frame containing only silence descriptors, encoded at the lowest rate and comprising only sixteen bits, the encryption overhead increases the data frame size by 600% (prior to MAC layer encapsulation and addressing).

According to one or more embodiments, a classification function 118 within the MAC layer processing function 116 inspects received encoded speech data frames and determines whether or not each frame includes encoded speech. That is, the classification function 118 distinguishes between data frames containing speech and data frames that contained only silence parameters. As discussed herein, the classification function 118 may perform this classification in a variety of ways. The classification function 118 indicates to the encryption function 120 which data frames contain speech and which data frames contain silence parameters, and only the data frames containing speech are encrypted. Data frames containing only silence parameters are not encrypted, and do not add the encryption overhead to the bandwidth requirements of the voice call.

In one embodiment, the classification function 118 concludes that encoded speech data frames at or below a predetermined size threshold (e.g., sixteen bytes) contain only silence descriptors, and do not contain encoded speech. In another embodiment, the classification function 118 inspects the encoded speech data frame header to ascertain the rate at which the speech was encoded, and concludes that data frames encoded at or below a predetermined data rate threshold (e.g., 4.75 kbps) contain only silence descriptors, and do not contain encoded speech. In yet another embodiment, the classification function 118 inspects the encoded speech data in the data frame, and compares the data to predetermined pattern data, or otherwise analyzes the data, to detect silence descriptors vs. encoded speech. In still another embodiment, the vocoder 114 may include a flag in the encoded speech data frame header identifying the data frame as containing either encoded speech or silence descriptors, which may be read by the classification function 118. Those of skill in the art will readily recognize that the classification function 118 may classify received encoded speech data frames as containing speech or not in a broad variety of ways, and the classification function 118 is not limited to specific embodiments disclosed.

A base station transceiver 122 transmits encrypted speech and non-encrypted silence parameters in the downlink direction to a mobile terminal 130. In one embodiment, the mobile terminal 130 similarly conserves network 100 bandwidth by not encrypting encoded speech data frames that do not contain speech. In particular, the mobile terminal 130 includes a user interface 132 and includes a microphone operative to transduce a user's speech into an electrical signal. The analog speech signal is analyzed by a vocoder 134, which digitally encodes the speech into a series of data frames. During pauses in the user's speech, the vocoder 134 encodes silence parameters into data frames, from which a receiving vocoder 114 may generate comfort noise. These silence parameters are encoded at the lowest vocoder 134 data rate, and encapsulated into the smallest encoded speech data frames generated by the vocoder 134.

Within a MAC layer processing function 136, a classification function 138 classifies encoded speech data frames as containing speech or not. The classification function 138 provides an indicator to the encryption function 140 indicating the classification of each encoded speech data frame. In response, the encryption function 140 encrypts plaintext encoded speech data in the data frames into encrypted cipher text, and prepends and appends the encryption overhead to the data frames. The encryption function 140 does not encrypt silence parameters in data frames that do not contain encoded speech. The MAC layer processing function 136 encapsulates both the encrypted data frames and non-encrypted data frames into data packets and generates and attaches MAC addresses to the data packets, passing them to lower level of network layers, which ultimately send the data packets to a transceiver 142 for transmission to the base station 104.

As part of MAC layer encapsulation, MAC layer processing functions 116, 136 generate and attach a MAC header to the encoded speech data frames. In WiMaX networks 100, the MAC header includes an EC flag, which indicates to a receiver whether or not the data packet includes encrypted data. The MAC layer processing functions 116, 136 set the EC flag for MAC data packets containing encrypted encoded speech, and clear the EC flag for MAC data packets containing non-encrypted silence parameters. A MAC layer processing function in a receiver will process the MAC data packets normally—decrypting the data or not according to the EC bit. Accordingly, no functionality or special processing is required at the receiver. In fact, the receiver does not require any knowledge of whether or not encoded speech data frames are selectively encrypted according to embodiments described herein.

Figure 2:
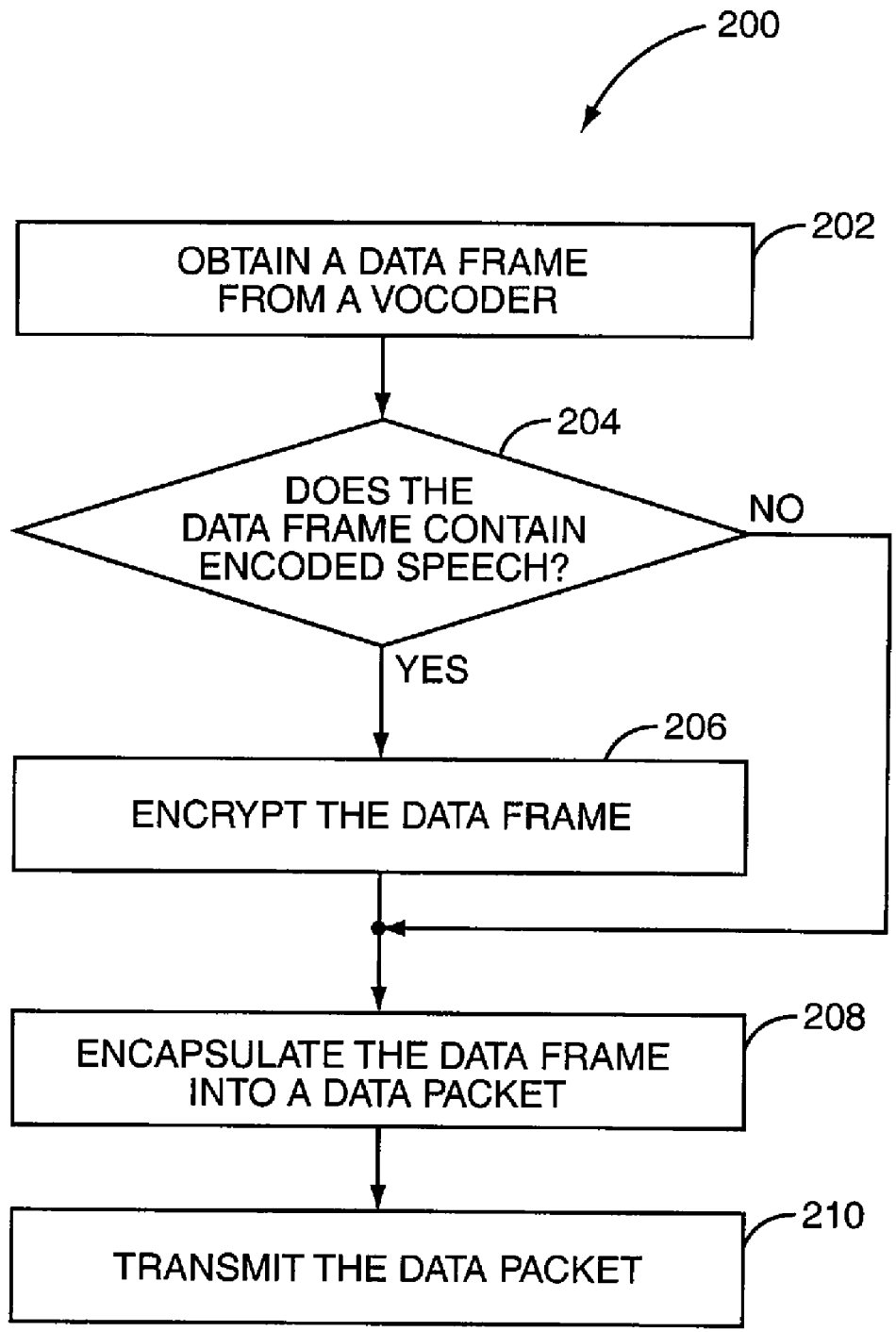
FIG. 2 is a flow diagram of a method of efficiently transmitting secure digital speech.

FIG. 2 depicts a method 200 of efficiently transmitting secure digital speech. A data frame is obtained from a vocoder 114, 134 (block 202). This may comprise receiving the data frame from a vocoder 114 across a Core Network 102 in the case of a base station 104, or may comprise receiving the data frame from a local vocoder 134 in the case of a mobile terminal 130. The data frame is classified as containing encoded speech or not (block 204). If the data frame contains encoded speech, the data is encrypted (block 206). On the other hand, if the data frame does not contain encoded speech (e.g., it contains silence parameters), the data is not encrypted. In either case, the data frame is encapsulated into a data packet (block 208). In one embodiment, the data packet includes an encryption flag indicating whether or not the data has been encrypted. The data packet is then transmitted to a receiver (block 210). This method 200 is repeated for each successive vocoder 114, 134 data frame.

A typical network 100 transport block—which, for a WiMaX network 100, for example, comprises an OFDM Physical Layer Frame—carries voice telephony calls to and from many users. The air interface resources available in each transport block are allocated to the various voice telephony users, and may additionally be allocated to other data users. According to one or more embodiments disclosed and claimed herein, the number of voice telephony users that may be supported in a transport block may be significantly increased by encrypting only vocoder data frames that contain encoded speech. By not encrypting vocoder data frames that do not contain encoded speech (e.g., those that contain silence parameters), the bandwidth penalty of transmitting the encryption overhead is avoided, with no loss of privacy or security.

While the maximum transmission efficiency and hence network 100 capacity is obtained when embodiments are deployed in both the uplink and downlink direction, improved efficiency and hence network 100 capacity may be obtained by utilizing embodiments in only the downlink, or by one or more mobile terminals 108 in the uplink. Furthermore, since the receiver requires no special processing or even knowledge of use of the embodiments at the transmitter, hybrid networks 100 deploying embodiments at only the base station 104 or in some or all mobile terminals 130 are fully interoperable.

In one or more embodiments, the classification functions 118, 138 may be selectively enabled. In situations where concealment of the silence parameters is necessary to preserve privacy or security—such as for example where the background noise of a user's environment is considered sensitive—the classification functions 118, 138 may be disabled, and all vocoder data frames are encrypted.

While embodiments of the present invention have been described herein with respect to a WiMaX implementation, the invention is not so limited and may advantageously be applied to any packet-switched wireless communication network transmitting secure digital voice telephony with an encryption overhead. Those of skill in the art will readily recognize that functional units depicted herein, such as vocoders 114, 134; MAC layer processing functions 116, 136; classification functions 118, 138; and encryption functions 120, 114 may be implemented as software programs stored in a machine-readable medium and executing on one or more controllers, processors, DSPs, or the like. Alternatively, any one or more of the functional units may be implemented as programmable logic, such as an FPGA, or may be implemented in hardware, such as an ASIC or discrete circuits.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of efficiently transmitting secure digital speech, comprising:
    digitally encoding speech audio into a plurality of data frames;
    classifying the data frames having a bit size meeting or exceeding a predetermined threshold as containing encoded speech, and classifying the data frames having a bit size below the threshold as not containing encoded speech;
    encrypting the data frames containing encoded speech;
    not encrypting the data frames not containing encoded speech;
    assembling the encrypted and non-encrypted data frames into one or more Media Access Control (MAC) Packet Data Units (PDU);
    setting an encryption indicator in the header of each MAC PDU containing an encrypted data frame; and
    transmitting the MAC PDUs.

2. The method of claim 1 wherein data frames not containing encoded speech contain silence parameters for generating comfort noise.

3. A method of efficiently transmitting secure digital speech, comprising:
    digitally encoding speech audio into a plurality of data frames;
    classifying the data frames as containing encoded speech or not based on a received voice indicator;
    encrypting the data frames containing encoded speech;
    not encrypting the data frames not containing encoded speech;
    assembling the encrypted and non-encrypted data frames into one or more Media Access Control (MAC) Packet Data Units (PDU);
    setting an encryption indicator in the header of each MAC PDU containing an encrypted data frame; and
    transmitting the MAC PDUs.

4. A base station of a wireless communication system receiving digitally encoded speech audio in a plurality of data frames, comprising:
    a classification circuit operative to classify the data frames having a bit size meeting or exceeding a predetermined threshold as containing encoded speech, and classify the data frames having a bit size below the threshold as not containing encoded speech;
    an encryption circuit operative to encrypt the data frames containing encoded speech and to not encrypt the data frames not containing encoded speech;
    a transceiver; and
    a MAC layer processing circuit operative to encapsulate encrypted and non-encrypted data frames into data packets, set an encryption indicator in each data packet header, and provide the data packets to the transceiver for transmission to a mobile terminal.

5. A base station of a wireless communication system receiving digitally encoded speech audio in a plurality of data frames, comprising:
    a classification circuit is operative to classify the data frames as containing encoded speech or not based on a received voice indicator;
    an encryption circuit operative to encrypt the data frames containing encoded speech and to not encrypt the data frames not containing encoded speech;
    a transceiver; and
    a MAC layer processing circuit operative to encapsulate encrypted and non-encrypted data frames into data packets, set an encryption indicator in each data packet header, and provide the data packets to the transceiver for transmission to a mobile terminal.

6. A wireless communication system mobile terminal, comprising:
    a user interface;
    a vocoder receiving speech audio from the user interface and digitally encoding the speech in a plurality of data frames;

a classification circuit operative to classify the data frames having a bit size meeting or exceeding a predetermined threshold as containing encoded speech, and classify the data frames having a bit size below the threshold as not containing encoded speech;

an encryption circuit operative to encrypt the data frames containing encoded speech and to not encrypt the data frames not containing encoded speech;

a transceiver; and a MAC layer processing circuit operative to encapsulate encrypted and non-encrypted data frames into data packets, set an encryption indicator in each data packet header, and provide both types of data packets to the transceiver for transmission to a wireless communication system base station.

7. A wireless communication system mobile terminal, comprising:

a user interface;

a vocoder receiving speech audio from the user interface and digitally encoding the speech in a plurality of data frames;

a classification circuit is operative to classify the data frames as containing encoded speech or not based on a speech signal from the user interface;

an encryption circuit operative to encrypt the data frames containing encoded speech and to not encrypt the data frames not containing encoded speech;

a transceiver; and a MAC layer processing circuit operative to encapsulate encrypted and non-encrypted data frames into data packets, set an encryption indicator in each data packet header, and provide both types of data packets to the transceiver for transmission to a wireless communication system base station.

8. A controller performing Media Access Control functions in a wireless communication system, comprising:

memory; and a processor accessing the memory and operative to
  receive digitally encoded speech audio in a plurality of data frames;
  classify the data frames having a bit size meeting or exceeding a predetermined threshold as containing encoded speech or not, and classify data frames having a bit size below the threshold as not containing encoded speech;
  encrypt the data frames containing encoded speech;
  not encrypt the data frames not containing encoded speech;
  assemble the encrypted and non-encrypted data frames into one or more Packet Data Units (PDU); and
  set an encryption indicator in the header of each MAC PDU containing an encrypted data frame.

9. The MAC controller of claim 8 wherein the controller is in a wireless communication system base station.

10. The MAC controller of claim 8 wherein the controller is in a wireless communication system mobile terminal.

11. A controller performing Media Access Control functions in a wireless communication system, comprising:

memory; and a processor accessing the memory and operative to
  receive digitally encoded speech audio in a plurality of data frames;
  classify the data frames as containing encoded speech or not based on a received voice indicator
  encrypt the data frames containing encoded speech
  not encrypt the data frames not containing encoded speech;
  assemble the encrypted and non-encrypted data frames into one or more Packet Data Units (PDU); and
  set an encryption indicator in the header of each MAC PDU containing an encrypted data frame.

\* \* \* \* \*

UNITED STATES PATENT AND TRADEMARK OFFICE
CERTIFICATE OF CORRECTION

| | |
|---|---|
| PATENT NO. | : 8,244,305 B2 |
| APPLICATION NO. | : 11/757679 |
| DATED | : August 14, 2012 |
| INVENTOR(S) | : Ramesh et al. |

It is certified that error appears in the above-identified patent and that said Letters Patent is hereby corrected as shown below:

In Column 2, Line 35, delete "cdma200Wideband" and insert -- cdma200,Wideband --, therefor.

In Column 5, Line 60, in Claim 1, delete "haying" and insert -- having --, therefor.

In Column 6, Line 49, in Claim 5, delete "circuit is" and insert -- circuit --, therefor.

In Column 7, Line 24, in Claim 7, delete "circuit is" and insert -- circuit --, therefor.

In Column 8, Line 9, in Claim 8, delete "speech or not," and insert -- speech, --, therefor.

In Column 8, Line 29, in Claim 11, delete "indicator" and insert -- indicator; --, therefor.

In Column 8, Line 30, in Claim 11, delete "speech" and insert -- speech; --, therefor.

Signed and Sealed this
Twenty-sixth Day of February, 2013

Teresa Stanek Rea
*Acting Director of the United States Patent and Trademark Office*